United States Patent
Zhou et al.

(10) Patent No.: US 11,802,060 B2
(45) Date of Patent: *Oct. 31, 2023

(54) BRINE PURIFICATION PROCESS

(71) Applicant: Blue Cube IP LLC, Clayton, MO (US)

(72) Inventors: Jianqing Zhou, Clayton, MO (US); Kurt Garbade, Clayton, MO (US); Sergio Sabater-Prieto, Clayton, MO (US); Martin Offermann, Clayton, MO (US)

(73) Assignee: Blue Cube IP LLC, Clatyon, MO (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/173,788

(22) Filed: Feb. 11, 2021

(65) Prior Publication Data

US 2021/0163317 A1    Jun. 3, 2021

Related U.S. Application Data

(63) Continuation of application No. 15/531,812, filed as application No. PCT/US2015/064097 on Dec. 4, 2015, now Pat. No. 11,014,832.

(Continued)

(51) Int. Cl.
   *C02F 1/42* (2023.01)
   *C02F 1/66* (2023.01)
   (Continued)

(52) U.S. Cl.
   CPC ............ *C02F 1/42* (2013.01); *C01D 3/06* (2013.01); *C01D 3/14* (2013.01); *C01D 3/145* (2013.01); *C02F 1/66* (2013.01); *C25B 1/46* (2013.01); *C25B 15/08* (2013.01); *C02F 2001/425* (2013.01); *C02F 2101/10* (2013.01); *C02F 2101/20* (2013.01); *C02F 2209/02* (2013.01); *C02F 2209/06* (2013.01); *C02F 2303/16* (2013.01); *Y02W 10/37* (2015.05)

(58) Field of Classification Search
   CPC .. C01D 3/06; C01D 3/14; C01D 3/145; C02F 1/42; C02F 1/66; C02F 2001/425; C02F 2101/10; C02F 2101/20; C02F 2209/02; C02F 2209/06; C02F 2303/16; C25B 15/08; C25B 1/46; Y02W 10/37
   See application file for complete search history.

(56) References Cited

U.S. PATENT DOCUMENTS

| | | |
|---|---|---|
| 4,830,837 A | 5/1989 | Justice et al. |
| 4,830,937 A | 5/1989 | Clerici |

(Continued)

FOREIGN PATENT DOCUMENTS

| | | |
|---|---|---|
| JP | 2002-528253 | 9/2002 |
| JP | 2003-509183 | 3/2003 |

(Continued)

OTHER PUBLICATIONS

Anon, "Process for Removal of Aluminum From Brine" IP.com, Oct. 5, 2006, 5pgs.

(Continued)

*Primary Examiner* — Dirk R Bass
(74) *Attorney, Agent, or Firm* — POLSINELLI PC

(57) ABSTRACT

The present invention provides a method for reducing the concentration of aluminum and nickel cations in a brine comprising aluminum and nickel cations. The treated brine can be used as a feedstock to membrane cell chlor-alkali process.

7 Claims, 4 Drawing Sheets

Related U.S. Application Data

(60) Provisional application No. 62/087,837, filed on Dec. 5, 2014.

(51) Int. Cl.
  *C01D 3/14* (2006.01)
  *C01D 3/06* (2006.01)
  *C25B 1/46* (2006.01)
  *C25B 15/08* (2006.01)
  *C02F 101/10* (2006.01)
  *C02F 101/20* (2006.01)

(56) References Cited

U.S. PATENT DOCUMENTS

| | | | |
|---|---|---|---|
| 6,103,092 | A | 8/2000 | Silva |
| 6,375,850 | B1 | 4/2002 | Deacon |
| 6,426,008 | B2 | 7/2002 | Silvia |
| 6,746,592 | B1 | 6/2004 | Mok et al. |
| 11,014,832 | B2 | 5/2021 | Zhou |
| 2001/0011645 | A1 | 8/2001 | Silvia et al. |
| 2011/0089116 | A1 | 4/2011 | Kipper et al. |

FOREIGN PATENT DOCUMENTS

| | | |
|---|---|---|
| JP | 2003-320392 | 11/2003 |
| JP | 2005-541313 | 5/2005 |
| JP | 2009-185338 | 8/2009 |
| TW | 200815101 | 4/2008 |
| WO | 200024674 | 5/2000 |
| WO | 2001014252 | 7/2000 |

OTHER PUBLICATIONS

Notice of Allowance and Fees Due for U.S. Appl. No. 15/531,812, issued by the USPTO dated Jan. 26, 2021.
Amendment After Non Final Office Action for U.S. Appl. No. 15/531,812, filed with the USPTO dated Oct. 12, 2020.
Non Final Office Action for U.S. Appl. No. 15/531,812, issued by the USPTO dated Aug. 25, 2020.
Request for Continued Examination [RCE] Transmittal in U.S. Appl. No. 15/531,812, filed with the USPTO dated Jul. 15, 2020.
Advisory Action for U.S. Appl. No. 15/531,812, issued by the USPTO dated Jul. 14, 2021.
Response to Final Office Action for U.S. Appl. No. 15/531,812, filed with the USPTO dated Jun. 30, 2020.
Final Office Action for U.S. Appl. No. 15/531,812, issued by the USPTO dated May 4, 2020.
Response to Non Final Office Action for U.S. Appl. No. 15/531,812, filed with the USPTO dated Feb. 3, 2020.
Non Final Office Action for U.S. Appl. No. 15/531,812, issued by the USPTO dated Nov. 8, 2019.
Advisory Action for U.S. Appl. No. 15/531,812, issued by the USPTO dated Oct. 7, 2019.
Response to Final Office Action for U.S. Appl. No. 15/531,812, filed with the USPTO dated Sep. 23, 2019.
Final Office Action for U.S. Appl. No. 15/531,812, issued by the USPTO dated Jun. 24, 2019.
Response to Non Final Office Action for U.S. Appl. No. 15/531,812, filed with the USPTO dated Apr. 9, 2019.
Non Final Office Action for U.S. Appl. No. 15/531,812, issued by the USPTO dated Dec. 5, 2018.
Office Action for JP Application No. 2020-069518, dated Mar. 30, 2021, english translation.
Japanese Appln. No. 2017-528109, Office Action dated Jul. 12, 2019.
Taiwan Appln. No. 104140722, Office Action dated Jun. 24, 2019.
Taiwan Appln. No. 104140722, Office Action dated Jan. 17, 2019.
International Search Report and Written Opinion for PCT/US2015/064097, dated Feb. 9, 2016.
Office Action for JP Application No. 2020-069518, dated Apr. 6, 2021, English translation.

BRINE PURIFICATION PROCESS

CROSS-REFERENCE TO RELATED APPLICATIONS

This application is a continuation of U.S. application Ser. No. 15/531,812, filed May 31, 2017, which is a national stage of international application PCT/US2015/064097, filed Dec. 4, 2015, which claims the benefit of U.S. provisional application 62/087,837, filed Dec. 5, 2014, and wherein each of the aforementioned applications are expressly incorporated herein by reference in their entirety.

FIELD

The present invention relates to a method of purifying brine which may be used in a membrane cell chlor alkali process.

BACKGROUND

Membrane cell chlor alkali processes use saturated sodium chloride brine solutions to generate sodium hydroxides, and to produce chlorine and hydrogen. General descriptions of membrane cell chlor alkali processes can be found in Kirk-Othmer Encyclopedia of Chemical Technology (John Wiley & Sons, $5^{th}$ Ed) and Ullman's Encyclopedia of Industrial Chemistry (John Wiley & Sons, $7^{th}$ Ed).

Membrane cell chlor alkali processes require brine with low levels of contaminants. The current densities of the present technology are higher than those of the past, and the higher current densities have increased the demand for higher brine purity levels to get stable and efficient performance.

Aluminum and nickel in brine can be deposited in the membrane during the operation of the membrane cell chlor-alkali process. Such depositions can cause deterioration in the membrane cell performance and can result in shortened membrane lifetime.

In "Process for Removal of Aluminum from Brine", IP.com Number IPCOM000141438D, published Oct. 5, 2006, the authors describe a method of removing dissolved aluminum from concentrated alkali metal halide brine solutions used in membrane electrolytic cells. After the incoming brine has been treated and has the required levels of calcium, magnesium, strontium, iron, chromium, nickel and barium, the pH of the brine is adjusted to between 1.5 to 4, preferably about 2 to 3, and the brine is contacted with a strong cationic chelating resin (such as an aminomethylphosphonic acid-functionalized polystyrene resin or an iminodiacetic acid-functionalized polystyrene resin) to remove the dissolved aluminum, operating the resin bed at flow rates of 1 to 30 bed volumes per hour (BV/h), and preferably 8 to 25 BV/h, separating the brine from the resin, readjusting the pH when necessary to the needed range for use in a chlor-alkali membrane cell, regenerating the resin with diluted sodium hydroxide and optionally resizing the resin bed with diluted hydrochloric acid. Operating temperatures are in the range of 10 to 90° C., typically in the range of 40 to 65° C. Examples of strong cationic exchange resins are AMBERLITE® IR747 or IRC 748 (Rohm & Haas Company, Philadelphia, PA) or LEWATIT TP 260 ion exchange resin (Sybron Chemicals Inc., Philadelphia, PA).

WO01/14252 teaches a multi-step process for the removal of impurities from brine solution where the brine solution comprises a water soluble chelating agent, such as sodium gluconate. The pH of the brine is adjusted from about 2 to about 4, and then solution is treated to remove multivalent metal cations by using a functionalized resin capable of removing multivalent metal cations. Chelating ion exchange resins that are effective for iron removal include iminodiacetic acid functionalized resins and aminomethyl phosphine acid functionalized resins. In this publication, commercially available suitable resins are identified as AMBERLITE IRC-718, manufactured by Rohm & Haas Co. and LEWATIT® TP207, manufactured by Bayer. The pH of the treated brine solution is then adjusted to a pH of from about 9 to about 11.5, and the brine solution is passed through a second functionalized resin which has functional groups capable of removing alkaline earth metal cations from the brine solution.

U.S. Pat. No. 4,830,937 teaches that an alkali metal halide brine is adjusted to a pH of 8.5 to 9 and contacting the pH adjusted alkali metal halide brine with an ion exchange resin having a phosphonic acid group.

U.S. Pat. No. 6,746,592 teaches a precipitation process which involves adding a defined amount of magnesium salts depending on the aluminum concentration.

There remains in the industry a need for improved methods of removing aluminum and nickel cations from brine.

SUMMARY

The present invention provides a cost effective process for the removal of aluminum and nickel cations from brine. The present invention is directed to a method for reducing the concentration of aluminum and nickel cations in a sodium chloride brine solution comprising aluminum and nickel cations. The method comprises determining the pH of the brine solution and, when the pH of the brine solution is in excess of 6 or below 2, adjusting the pH of the brine solution to a pH from 2 through 6. After any necessary pH adjustment, the brine solution is contacted with a mixture of at least two cationic exchange resins. The first cationic exchange resin comprises an aminophosphonic acid functional group and the second cationic exchange resin comprises an iminodiacetic acid functional group. The contacting occurs at a linear liquid velocity from 10 through 100 m/hr, and at a temperature of from 10 through 90° C. and produces a treated brine solution which contains less aluminum and nickel cations than prior to contacting the brine solution with the mixture of at least two cationic exchange resins.

In one embodiment, the present invention is directed to a method for reducing the concentration of aluminum and nickel cations in a sodium chloride brine solution comprising aluminum and nickel cations to provide a brine feedstock used in a membrane cell chlor-alkali process. The method comprises determining the pH of the brine solution and, when the pH of the brine solution is in excess of 6 or below 2, adjusting the pH of the brine solution to a pH from 2 through 6. After any necessary pH adjustment, the brine solution is contacted with a mixture of at least two cationic exchange resins. The first cationic exchange resin comprises an aminophosphonic acid functional group and the second cationic exchange resin comprises an iminodiacetic acid functional group. The contacting occurs at a linear liquid velocity from 10 through 100 m/hr, and at a temperature of from 10 through 90° C. and produces a treated brine solution which contains less aluminum and nickel cations than prior to contacting the brine solution with the mixture of at least two cationic exchange resins. The brine is then used as a feedstock in a membrane cell chlor-alkali process.

The present invention allows the removal of both cations in the same unit operation, thus reducing capital investment. Operating costs can be further reduced by treating the brine for reduction of the concentration of calcium, barium, strontium and/or magnesium cations prior to the treatment of the present invention to reduce the concentration of aluminum and nickel cations as there will be one less acidification step performed and one less step to readjust pH for calcium and magnesium removal on the brine when the brine is treated in this sequence.

DETAILED DESCRIPTION

Figure 1:
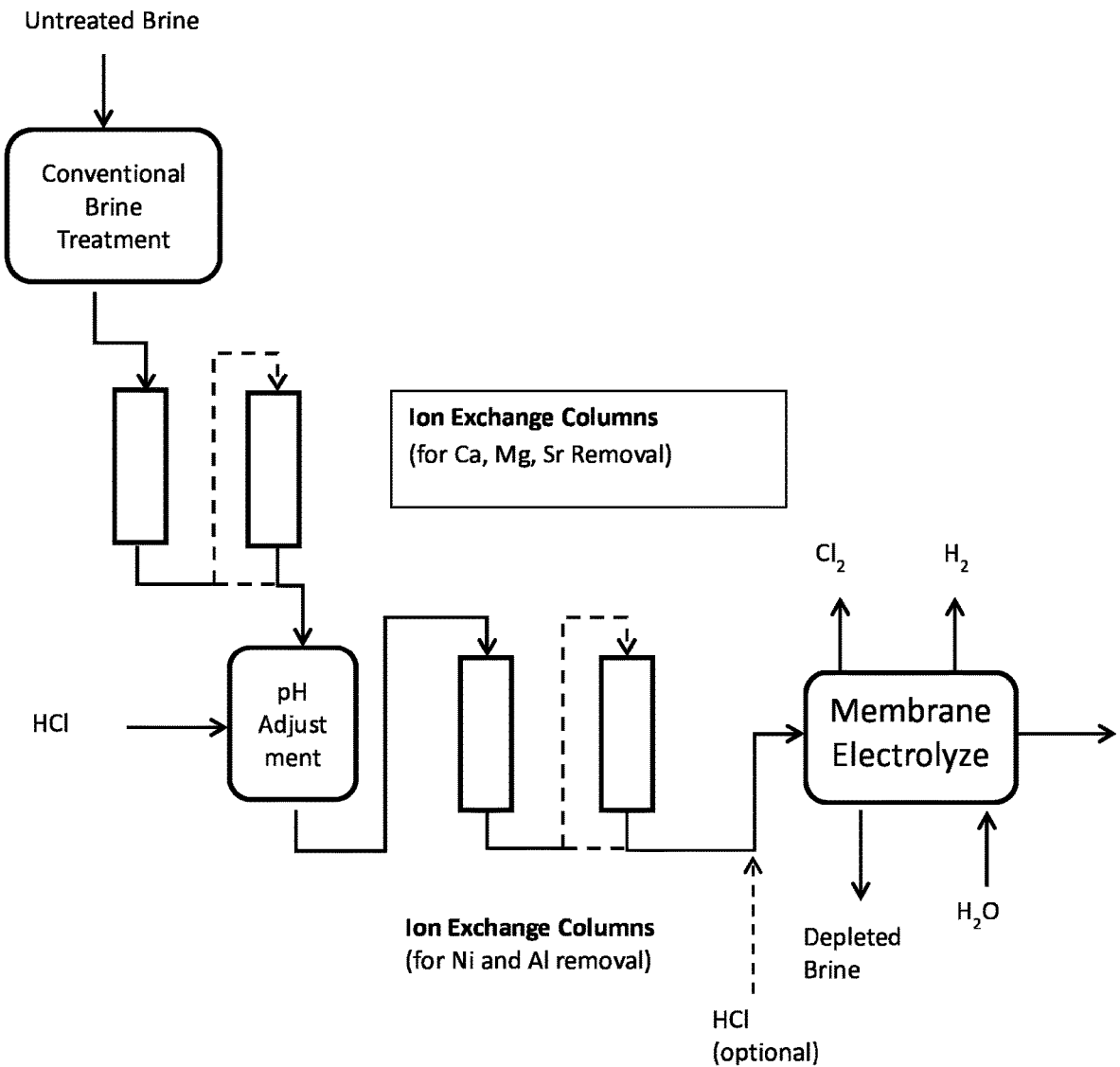
FIG. 1 is a block diagram illustrating one embodiment of the brine purification process of the present invention. The "Conventional Brine Treatment" in FIG. 1 refers to the steps well known to those of skill in the art such as saturation, precipitation, clarification, and filtration. See, e.g., Kirk-Othmer Encyclopedia of Chemical Technology 5th Edition, John Wiley & Sons, and/or Ullmann's Encyclopedia of Industrial Chemistry, Ullmann's Encyclopedia of Industrial Chemistry, 7th Edition, John Wiley & Sons, Inc. or SECONDARY BRINE TREATMENT: ION-EXCHANGE PURIFICATION OF BRINE, Ian F. White, T. F. O'Brien in Modern Chlor-Alkali Technology 1990, pp 271-289

The present specification provides certain definitions and methods to better define the present invention and to guide those of ordinary skill in the art in the practice of the present invention. Provision, or lack of provision, of a definition for a particular term or phrase is not meant to imply any particular importance, or lack thereof; rather, and unless otherwise noted, terms are to be understood according to the conventional usage by those of ordinary skill in the relevant art. Unless defined otherwise, technical and scientific terms used herein have the same meaning as commonly understood by one of skill in the art to which this invention belongs.

As used herein, "brine" is an aqueous solution of a sodium chloride. Brine can contain between 50 grams per liter of sodium chloride in water up to saturation, preferably between 100 to 320 grams per liter and more preferably between 180 to 315 grams per liter.

The terms "aluminum" and "nickel" refer to the compounds in their cationic form.

A "cationic exchange resin" or "cation-exchange resin" means an insoluble organic polymer having negatively charged functional groups attached to it that can attract and hold cations in a surrounding solution. "Chelating resins" are a subgroup of ion exchange resins and, in this application, refer to cation exchange resins having chelating iminodiacetate groups or having chelating amino methyl phosphonic (also known as aminophosphonic) groups. Suitable commercially available chelating amino phosphonic resins for use in the present invention include, but are not limited to, AMBERLITE® IRC747UPS, The Dow Chemical Company, USA; LEWATIT® MonoPlus TP 260, Lanxess AG, Cologne, Germany; Purolite® S-940, The Purolite Company, 150 Monument Road, Bala Cynwyd, PA 19004, USA, and D402-II, Jiangsu Suqing Water Treatment Engineering Group Co., Ltd. Huazhai Road, Hetang, Jiangyin, Jiangsu, China. Suitable commercially available chelating resins having iminodiacetate functionalized groups for use in the present invention include, but are not limited to, AMBERLITE® IRC748, The Dow Chemical Company, USA; LEWATIT® MonoPlus TP 207 Lanxess AG, Cologne, Germany; and Purolite® S-930, The Purolite Company, 150 Monument Road, Bala Cynwyd, PA 19004, USA; D402, Jiangsu Suqing Water Treatment Engineering Group Co., Ltd. Huazhai Road, Hetang, Jiangyin, Jiangsu, China.

Upon review of the results obtained from experiments such as those reported in "Process for Removal of Aluminum from Brine", IP.com Number IPCOM000141438D, published Oct. 5, 2006, it was learned that some amount of nickel could be removed at certain pH conditions with treatment of the incoming brine as reported in that publication, but the amount of nickel removed was insufficient to meet the low levels of nickel required or preferred in the brine for a membrane cell chlor-alkali process.

A "membrane cell chlor-alkali process" refers to the electrolysis of brine where saturated or almost saturated brine is passed into the first chamber of the cell where the chloride ions are oxidized at the anode, losing electrons to become chlorine gas. At the cathode, positive hydrogen ions from water molecules are reduced by the electrons provided by the electrolytic current, to hydrogen gas, releasing hydroxide ions into the solution. The ion-permeable ion exchange membrane at the center of the cell allows the sodium ions to pass to the second chamber where they react with the hydroxide ions to produce sodium hydroxide. The membrane preferably only allows positive ions, which may be hydrated, to pass through, preventing the halide gas from mixing with the alkali metal hydroxide and also prevent the halide ions from the brine from contaminating the hydroxide solution.

The present invention is directed to a method for reducing the concentration of aluminum and nickel cations in brine comprising aluminum and nickel cations. The method comprises determining the pH of the brine and, when the pH of the brine is in excess of 6 or below 2, adjusting the pH of the brine to a pH from 2 through 6. After any necessary pH adjustment, the brine is contacted with a mixture of at least two cationic exchange resins. The first cationic exchange resin comprises an aminophosphonic acid functional group and the second cationic exchange resin comprises an iminodiacetic acid functional group. The contacting occurs at a linear liquid velocity from 10 through 100 m/hr, and at a temperature of from 10 through 90° C. and produces a treated brine which contains less aluminum and nickel cations than prior to contacting the brine with the mixture of at least two cationic exchange resins.

In one embodiment, the present invention is directed to a method for reducing the concentration of aluminum and nickel cations in brine comprising aluminum and nickel cations to provide a brine feedstock used in a membrane cell chlor-alkali process. The method comprises determining the pH of the brine and, when the pH of the brine is in excess of 6 or below 2, adjusting the pH of the brine to a pH from 2 through 6. After any necessary pH adjustment, the brine is contacted with a mixture of at least two cationic exchange resins. The first cationic exchange resin comprises an aminophosphonic acid functional group and the second cationic exchange resin comprises an iminodiacetic acid functional group. The contacting occurs at a linear liquid velocity from 10 through 100 m/hr, and at a temperature of from 10 through 90° C. and produces a treated brine which contains less aluminum and nickel cations than prior to contacting the brine with the mixture of at least two cationic exchange resins. The brine is then used as a feedstock in a membrane cell chlor-alkali process.

The brine to be treated according to the method of the present invention may be generated from solution-mining, dissolving rock salt, solar salt, or vacuum salt. In one embodiment of the present invention, the brine to be treated is not a by-product from condensation polymer manufacture. In one embodiment of the present invention, the brine to be treated does not comprise a gluconate anion.

The ratio of the first cationic exchange resin to the second cationic exchange resin in the mixture is from 10:90 to 90:10, from 20:80 to 80:20, or from 40:60 to 60:40. The preferred ratio is dependent upon the concentrations of aluminum and nickel cations which are present. While iminodiactic acid functional resins have a lower leakage rate for nickel than for aluminum, the aminophosphonic acid functional group resins have a higher affinity for aluminum than for nickel. Absorption kinetics and capacity also depends on the pH and flow rates. Measuring break through curves of these ions at different pH and different ion exchange resin mixtures allows the person skilled in the art to find the optimum, depending on the nickel and aluminum concentrations in the specific brine, which may possibly contain chelating or complexing agents influencing the absorption. The resin mixture and operating pH leading to the longest operation time without exceeding the desired specification for the targeted ions is the optimum.

Contacting brine with the mixture of at least two cationic exchange resins may be performed by methods known in the art, such as batch, continuous, or semi-continuous methods. In a preferred method, the brine is passed through a vessel, such as a column, containing a bed of the mixture of the at least two cationic exchange resins. Passage of the brine through the bed may continue until the cationic complexing capability of the resin bed is substantially exhausted for at least one cation, as shown by an increase in the concentration of the cations exiting the vessel containing the resin bed.

There are no limitations on the types of membranes or brine electrolyzers used in the membrane cell chlor-alkali processes which can make use of the present invention. Examples of membranes which can be used in the membrane cell chlor-alkali processes wherein the present invention can be used include Nafion N2030 (E.I. du Pont de Nemours and Company, Nafion Global Customer Service, Fayetteville, NC USA) Aciplex F6801 (Asahi Kasei Chemicals Corp, Tokyo, Japan) and Flemion 8080 (Asahi Glass Co., Ltd., Tokyo, Japan). Examples of brine electrolyzers in which the invention can be used include monopolar and bipolar electrolyzers. Brine electrolyzers are commercially available from Asahi Kasei Chemicals Corp, Chlorine Engineers Corporation, Krupp Uhde, El-Tech, and Ineos, or their successor organizations.

Typically, membrane cell chlor-alkali processes operate at between 70 and 95° C., with current densities in the range between 1.0 kA/m$^2$ to 10 kA/m$^2$, anolyte concentrations at 170 to 230 gpl NaCl, and sodium hydroxide concentrations at 30 to 35% NaOH. Typically, the anolyte pH of the cells can be between 2 and 5, depending on the requirements of chlorine purity. To reach this pH range, the brine is typically, but not necessarily acidified, for example, using HCl concentrations in the inlet brine in the range of 0 to 0.3 N. The concentration will depend on the membrane performance. Higher concentrations are required when performance as measured by, e.g., caustic current efficiency is dropping.

The pH of the brine from which the concentrations of the aluminum and nickel are to be reduced is in a range of 2 to 6, more preferably from 3 to 4. The pH can be determined by methods known to those of ordinary skill in the art. After the treatment, the brine is fed to one or more membrane chlor-alkali cells. As in most cases brine is acidified before it is fed into the cells, independent of cell type or manufacturer, to achieve the desired chlorine purity, this same acidification step can be used to adjust the brine pH to the range desired for the ionic exchange process for removing aluminum and nickel. Therefore, no additional acidification step may be needed for this process. The temperature at which the brine from which the concentrations of aluminum and nickel are to be reduced is a temperature of from 10 to 90° C., more preferably from 50 to 70° C., and even more preferably from 55 to 65° C. Typically, the temperature is measured at the inlet of the vessel, such as a column or bed or other structure containing the mixture of at least two cationic exchange resins.

The linear liquid velocity through the vessel containing the mixture of the at least two cationic exchange resins of the brine from which the concentrations of aluminum and nickel are to be reduced is from 10 through 100 m/hr as measured either at the inlet or the outlet of the vessel. The diameter of the vessel should be designed such that the calculated empty bed linear liquid velocity of the brine through the vessel is between 0 and 100 m/hr, preferably 10 to 50 m/hr and more preferably 10 to 30 m/hr. The flow rate of the brine through the vessel is between 0 and 40 BedVolumes per hour (BV/hr), and preferably between 8 and 30 BV/hr.

In one embodiment of the present invention, the mixture of resins is regenerated by the treatment of the mixture with a base of between 1 and 10% solution and by treatment with an acid of between 1 and 12% solution. It is preferred to first treat the mixture of resins with the base, followed by the treatment with the acid. When the treatment is done in this order, it has the advantage that the resulting initial brine produced by the columns directly after regeneration is at the pH which can be used without further adjustment from high pH range to the desired pH for use as a feedstock in a membrane cell chlor-alkali process. In addition the resin beads will have a more preferred diameter for operation, because the beads are smaller when in the H+ form than when in the Na+ form. This is advantageous because otherwise the beads would shrink during operation and could form undesired channels. Preferred bases for the regeneration of the resin comprise sodium hydroxide and potassium hydroxide. Preferred acids for the regeneration of the resin comprise hydrochloric acid and sulfuric acid. Techniques for regenerating ionic exchange resins are well known in the art.

In one embodiment of the present invention, the brine is treated to reduce the concentration of calcium, barium, strontium and/or magnesium cations in the brine prior to contacting the brine with a mixture of at least two cationic exchange resins. It is preferred to first reduce the concentration of calcium, barium, strontium and/or magnesium cations as that reduction occurs at a high pH, typically above 9. A molar excess of carbonate relative to calcium may be present. After the pH is adjusted for the reduction of aluminum and nickel cations by the use of the mixture of the at least two cationic exchange resins, it can then be further acidified or adjusted for use as a feedstock in a cell membrane chlor-alkali process, thus providing economic advantages.

Prior to treatment with the present invention, the brine can contain up to 100 ppb nickel and preferably up to 20 ppb nickel. The brine can contain up to less than 5 ppm aluminum. After treatment with the present invention, the concentration of aluminum in the brine is reduced to at least <50 ppb, preferably to at least <20 ppb, and most preferably to at least <10 ppb. After treatment with the present invention, the concentration of nickel in the brine is reduced to at least <10 ppb, preferably to at least <5 ppb, and most preferably to at least <1 ppb.

EXAMPLES

In the following Example and Comparative Example, the brine has been saturated, precipitated, clarified, filtered and subjected to ion exchange treatment for reduction of the concentrations of calcium, barium, strontium and/or magnesium cations.

Example 1

A mixed ion exchange bed, consisting of 55% iminodiacetic acid chelating resin AMBERLITE® IRC748, The Dow Chemical Company, USA and 45% aminophosphonic chelating resin AMBERLITE® IRC747UPS, The Dow Chemical Company, USA, were used for Example 1.

Figure 2:
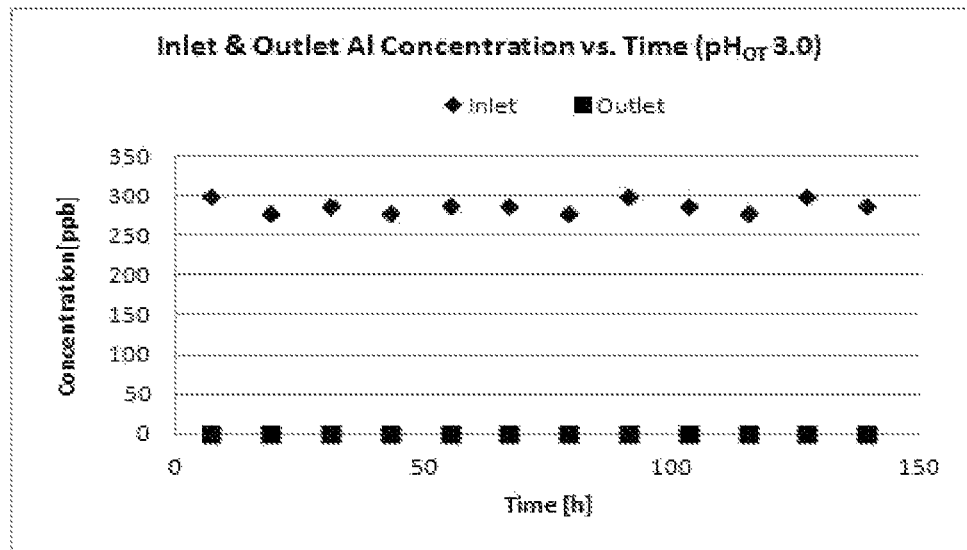
FIG. 2 shows the inlet and outlet aluminum concentration over time for the process of Example 1.
Figure 3:
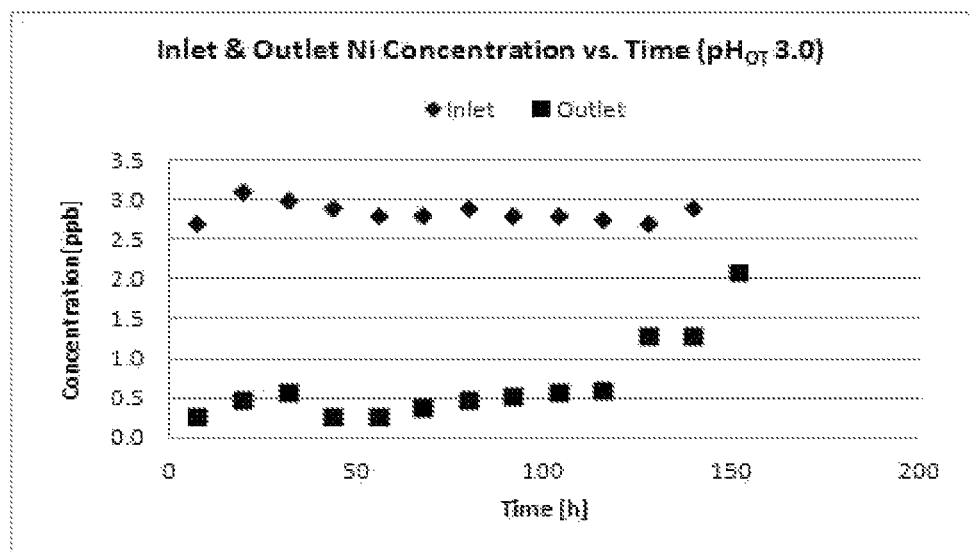
FIG. 3 shows the inlet and outlet nickel concentration over time for the process of Example 1.

Eleven (11) $m^3/hr$ of acidified brine, having pH 3 and containing 305 g/l NaCl at a temperature between 63-65° C. at the column inlet are pumped (down flow) into a column containing 600 liter of the chelating resin mixture. The column has a diameter of 600 mm and has a nozzle plate at the bottom with 14 nozzles. The nozzles (KSH GmbH Kleemeir, Schewe & CO., Herford, Germany), type C 1 slit size of 0.2 mm. The brine flow rate is 20 BV/h, and the linear liquid velocity is brine 42 m/h. The volume flow of acidified brine into the column, the brine temperature and the pH of the brine upon entering and upon leaving the column are recorded. Inlet samples and outlet samples are taken every 8 hours to analyze the nickel and aluminum content and determine the removal efficiency of the ions. As shown in FIGS. 2 and 3, aluminum is reduced from about 300 ppb to below the detection limit (~<2 ppb) and nickel is reduced from about 3 ppb to ~<0.5 ppb. Nickel breaks through after about 120 hours, while aluminum in the outlet is still below the detection limit.

Comparative Example 1

Brine containing 305 g/l NaCl containing about 3 ppb nickel and 300 ppb aluminum are treated in a lab column (20 mm diameter, and 60 mm height) filled with 100 ml iminodiacetic acid chelating resin (Lewatit® TP207, Lanxess) under the following conditions:
  a. pH of the brine (as measured at the inlet): 4
  b. Temperature of the brine (as measured the inlet): room temperature (about 20° C.); and
  c. Linear liquid velocity of brine 6.4 m/h as measured at the outlet and a brine flow rate 20 BV/h.

The outlet brine of the column is collected for lab cell testing. After 400 liter brine is treated, the column is switched to regeneration. 1050 ml 4% NaOH and then 850 ml 6% HCl are used for the regeneration. The effluent from the regeneration is collected and analyzed for aluminum and nickel. Based on the effluent analysis, it was calculated how much nickel and aluminum are removed from brine, which is 2.2 ppb nickel and about 13 ppb aluminum. Under these conditions, the resin removes nickel effectively, but not the aluminum.

A laboratory scale cell membrane chlor alkali process equipped with Aciplex® F4401 membrane (Asahi Kasei Chemicals Corp, Tokyo, Japan) is run with the treated brine which has had its pH readjusted to 12. The process is run at 90° C., 32% NaOH in catholyte, 18% NaCl in anolyte at a current density of 4.5 $kA/m^2$. After running for about 80 days, the membrane is analyzed for nickel and aluminum. The deposition rate of nickel is reduced from 6 $mg/dm^2$ per year (without the nickel removal) to <1 $mg/dm^2$ per year with the nickel removal, but there is no significant improvement for aluminum deposition in membrane. This test confirms that the aluminum is not removed at all or at least not sufficiently.

Comparative Example 2

Figure 4:
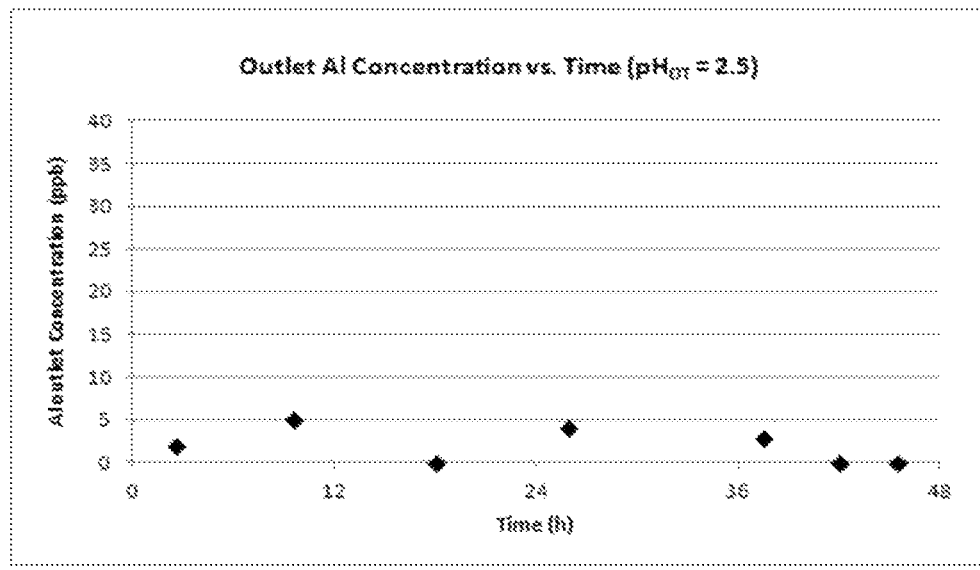
FIG. 4 shows the outlet aluminum concentration over time for the process of Comparative Example 2.
Figure 5:
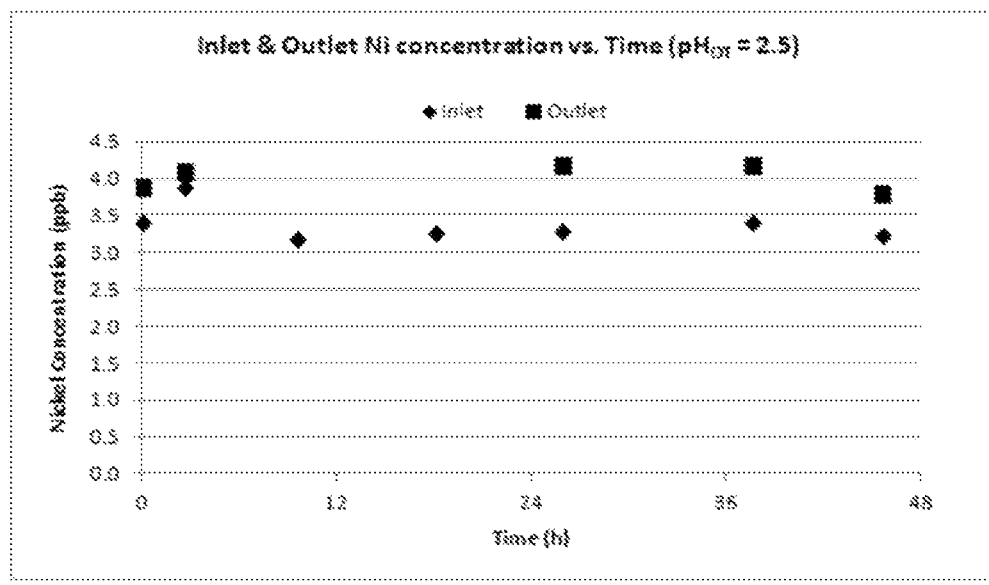
FIG. 5 shows the inlet and outlet nickel concentration over time for the process of Comparative Example 2.

Aminophosphonic chelating resin (AMBERLITE® IRC747UPS, The Dow Chemical Company, USA) is used for Comparative Example 2. Using the same testing unit described in Example 1, 11 $m^3/hr$ of acidified brine having a pH of 2.5 and containing 305 g/l NaCl at temperature measured at the inlet of the column between 63-65° C. are pumped (down flow) into the column. The volume flow into the column, brine temperature and the pH before and after the column are recorded. Inlet samples and outlet samples are taken every 8 hours to analyze the nickel and aluminum content and determine the removal efficiency of ions. As shown in FIGS. 4 and 5, there is no nickel removal during 48 hours of operation while aluminum is reduced from 300 ppb to <5 ppb.

Comparative Example 3

Figure 6:
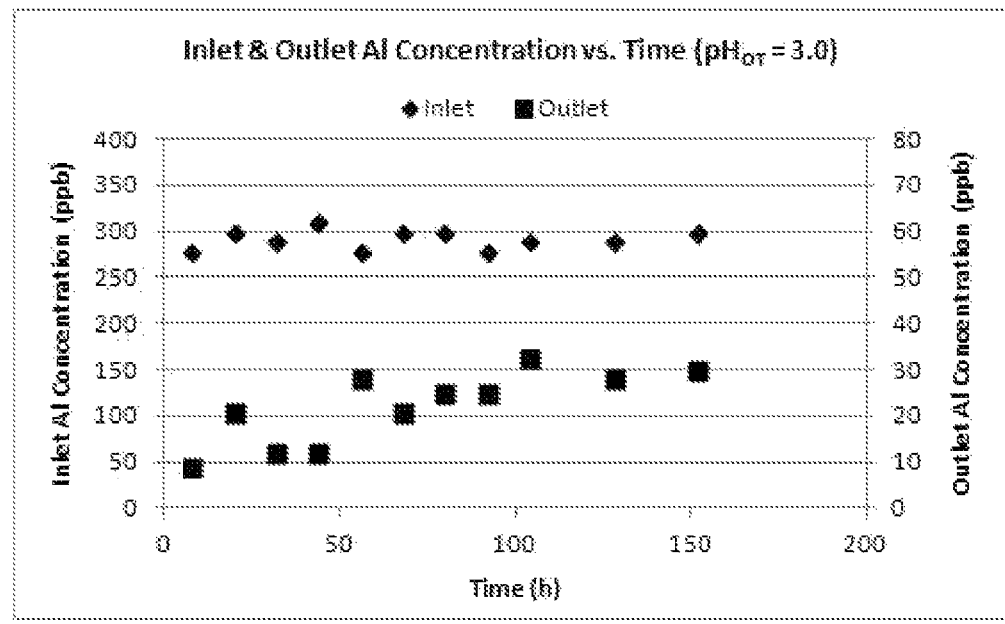
FIG. 6 shows the inlet and outlet aluminum concentration over time for the process of Comparative Example 3.
Figure 7:
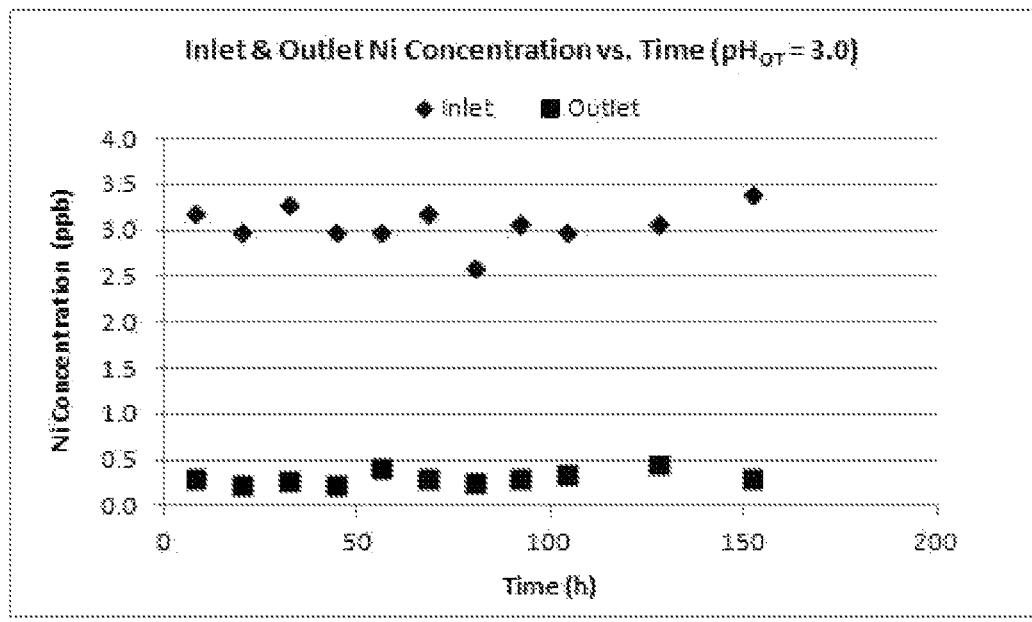
FIG. 7 shows the inlet and outlet nickel concentration over time for the process of Comparative Example 3.

Iminodiacetic acid chelating resin (AMBERLITE® IRC748, The Dow Chemical Company, USA) is used for Comparative Example 3. Using the same testing unit described in Example 1, 11 $m^3/hr$ of acidified brine having a pH of 3 and containing 305 g/l NaCl at temperature measured at the inlet of the column between 63-65° C. are pumped (down flow) into the column. The volume flow into the column, brine temperature and the pH before and after the column are recorded. Inlet samples and outlet samples were taken every 8 hours to analyze the nickel and aluminum content and determine the removal efficiency of ions. As shown in FIGS. 6 and 7, nickel is reduced from >3 ppb to <0.5 ppb, while aluminum is not below 50 ppb in the outlet.

Example 2

The regeneration procedure involves the addition of certain chemicals to the mixture of ion exchange resins in the vessel. A general, exemplary, outline of the sequence for this chemical addition is set forth below. The times below are identified to accommodate operational issues with the plant, not necessarily the amount of time needed.

| Medium/Purpose | Flow | Flow rate BV/h | Time (min) |
| --- | --- | --- | --- |
| Condensate rinse | Down | 3.5 | 50 |
| Condensate rinse | Up | 3.5 | 30 |
| NaOH 5%/ Caustic conversion | Up | 3.3 | 30 |

-continued

| Medium/Purpose | Flow | Flow rate BV/h | Time (min) |
|---|---|---|---|
| Wait Time | — | — | 600 |
| NaOH 5%/ Caustic conversion | Up | 3.3 | 20 |
| Wait Time | — | — | 300 |
| NaOH 5%/ Caustic conversion | Up | 3.3 | 10 |
| Wait Time | — | — | 180 |
| Condensate/rinse | Up | 1.8 | 120 |
| HCl 6%/ Acid regeneration | Down | 4.4 | 60 |
| Condensate rinse | Up | 1.8 | 120 |
| Condensate rinse | Up | 1.8 | 30 |

The conditions in the table above are exemplary, and can be varied, depending on the resin type, and the levels of aluminum and nickel in the brine. "Condensate" refers to the liquid phase produced by the condensation of steam, which is provided from the plant. Brine may also be used as a rinse. The advantage to using the condensate and/or the brine as a rinse is to help avoid or reduce osmotic shock to the resin.

The effectiveness success of the described regeneration process is checked by measuring the amount of aluminum and nickel found in the regeneration liquids and comparing them to the amounts removed from the brine. Nickel is mainly found in the acid regeneration liquid (and the following condensate) and aluminum in the alkaline and subsequent condensate effluent. Within the accuracy of the measurements, the resin is fully regenerated. Several consecutive operation/regeneration cycles are used to confirm the regeneration.

What is claimed is:

1. A method comprising:
   providing an inlet brine to a vessel including a resin bed having a mixture of at least two cationic exchange resins comprising a first cationic exchange resin comprising an aminophosphonic acid functional group and a second cationic exchange resin comprising an iminodiacetic acid functional group, wherein the inlet brine has a pH of from 2 to 6, a linear liquid velocity from 10 through 100 m/hr, a temperature of from 10 to 90° C., and does not contain a chelating or complexing agent; and
   contacting the inlet brine with the mixture of resins to produce a treated brine which contains less aluminum and nickel cations than the inlet brine, wherein prior to contacting the inlet brine with the mixture of the at least two cationic exchange resins the inlet brine has a concentration of from about 300 ppb to about 5 ppm aluminum and from about 3 ppb to about 100 ppb nickel, and wherein the concentration of aluminum and nickel is reduced in the treated brine to less than about 50 ppb aluminum and to less than about 1 ppb nickel after contact with the mixture of the at least two cationic exchange resins.

2. The method of claim 1, wherein the mixture comprises two cationic exchange resins and the ratio of the first cationic exchange resin to the second cationic exchange resin in the mixture is from 10:90 to 90:10.

3. The method of claim 1, wherein the mixture comprises two cationic exchange resins and the ratio of the first cationic exchange resin to the second cationic exchange resin in the mixture is from 20:80 to 80:20.

4. The method of claim 1, wherein the mixture comprises two cationic exchange resins and the ratio of the first cationic exchange resin to the second cationic exchange resin in the mixture is from 40:60 to 60:40.

5. The method of claim 1, wherein the mixture of resins are regenerated by a treatment comprising a base of between 1 and 10% solution and by treatment comprising an acid of between 1 and 12% solution.

6. The method of claim 1, wherein the inlet brine has a pH of from 3 to 4.

7. The method of claim 1, wherein the temperature is from 55 to 65° C.

* * * * *